Nov. 7, 1950    J. H. MOORE    2,528,967
CIRCUIT STANDARDIZING ACTUATING MECHANISM
Filed July 8, 1949    5 Sheets-Sheet 1

Fig.1

*INVENTOR.*
JOHN H. MOORE
BY
Woodcock and Phelan
ATTORNEYS

Nov. 7, 1950        J. H. MOORE        2,528,967

CIRCUIT STANDARDIZING ACTUATING MECHANISM

Filed July 8, 1949        5 Sheets-Sheet 2

*INVENTOR.*
JOHN H. MOORE
BY
*Woodcock and Phelan*
ATTORNEYS

INVENTOR:
JOHN H. MOORE
BY
Woodcock and Phelan
ATTORNEYS

Nov. 7, 1950　　　　　J. H. MOORE　　　　　2,528,967
CIRCUIT STANDARDIZING ACTUATING MECHANISM
Filed July 8, 1949　　　　　　　　　　　　5 Sheets-Sheet 4

INVENTOR.
JOHN H. MOORE
BY
Woodcock and Phelan
ATTORNEYS

Nov. 7, 1950 J. H. MOORE 2,528,967
CIRCUIT STANDARDIZING ACTUATING MECHANISM
Filed July 8, 1949 5 Sheets-Sheet 5

INVENTOR.
JOHN H. MOORE
BY
Woodcock and Phelan
ATTORNEYS

Patented Nov. 7, 1950

2,528,967

UNITED STATES PATENT OFFICE 2,528,967

CIRCUIT STANDARDIZING ACTUATING MECHANISM

John H. Moore, Havertown, Pa., assignor to Leeds and Northrup Company, Philadelphia, Pa., a corporation of Pennsylvania Application July 8, 1949, Serial No. 103,572

17 Claims. (Cl. 74—1)

This invention relates to actuating mechanism for operating a control member between predetermined positions, more particularly to actuating mechanism for effecting standardization of a measuring network, and the invention has for an object the provision of improved actuating mechanism of this character.

In self-balancing recorder and controller systems such as are shown and described in United States Letters Patent No. 2,113,069 granted April 5, 1938 to R. W. Ross et al. for Indicating, Recording and/or Controlling Apparatus, automatic standardization of the measuring network is effected from time to time by temporarily shifting the connection of the detector, such as a galvanometer or other device, from the measuring network to a standardizing circuit and by concurrently effecting a mechanical driving connection between a standardizing impedance or equivalent and the rebalancing device so that the detector and balancing mechanism are operative to effect adjustment of the standardizing impedance to compensate for any shift in calibration of the measuring network. In the actuating mechanism disclosed in the aforesaid Ross et al. patent, an abrupt rise in a motor-driven cam is utilized to terminate the standardizing operation and restore the actuating mechanism and while this arrangement has been satisfactory and used to a substantial extent, nevertheless it leaves something to be desired in a mechanism which will operate with lower and substantially constant torque requirements as distinguished from the sudden relatively high torque requirements heretofore required.

Accordingly it is a further object of the present invention to provide a standardizer actuating mechanism having low and substantially constant torque requirements, thereby making feasible the utilization of smaller driving motors in instruments of the type disclosed in the said Ross et al. patent.

In carrying out the invention in one form, a first or operating biasing means is provided for initiating the standardizing operation upon the release of suitable latching means, and means are provided operable during the interval between standardizing operations for gradually accumulating energy in a second or master biasing means which, when released, employs a portion of its accumulated energy to terminate the standardizing operation and transfers another portion of its accumulated energy to the first or operating biasing means for use in a succeeding operation. While the actuating mechanism has been found particularly useful for effecting automatic standardizing operations, it is to be understood that it may be used for other purposes and is particularly applicable to the abrupt movement of a control member from a first to a second position and then back to the first position by means of energy gradually accumulated in a master biasing means.

For a more detailed understanding of the invention, together with further objects and advantages thereof, reference is to be had to the following description taken in conjunction with the accompanying drawings, in which.

Figure 1:
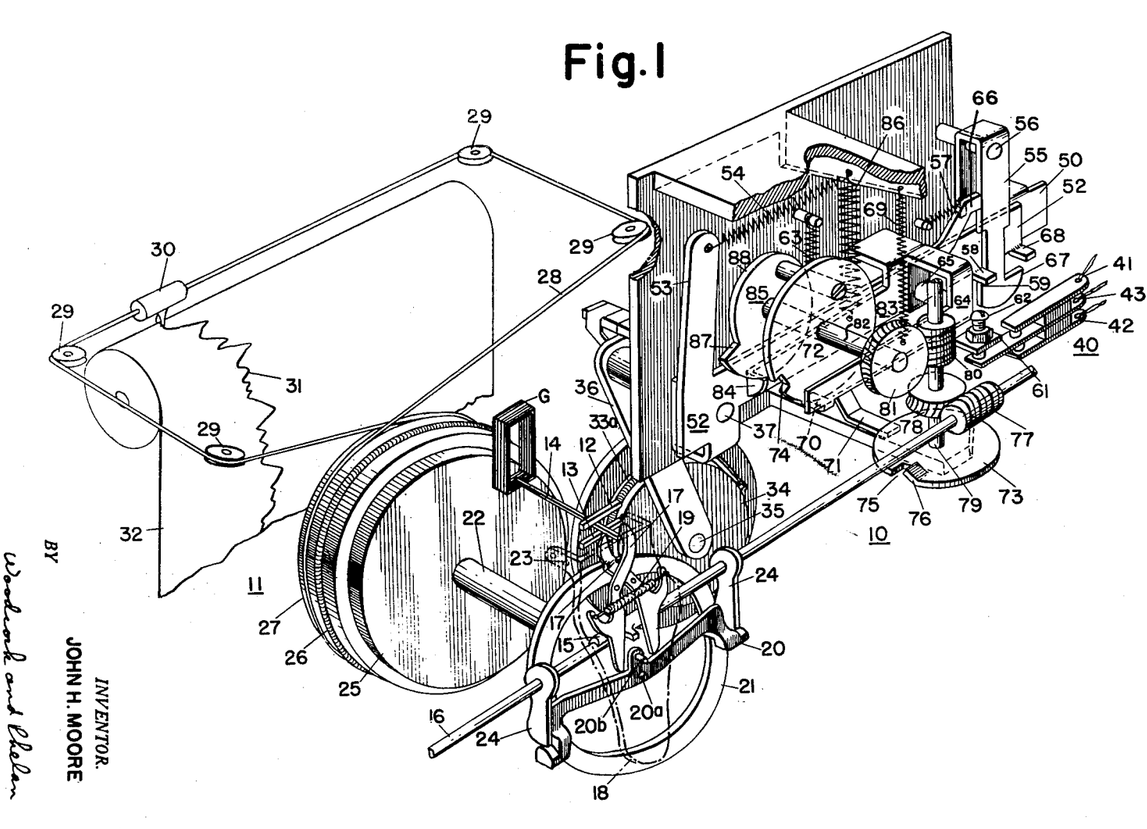
Fig. 1 is a somewhat diagrammatic perspective view showing an actuating mechanism embodying the present invention applied to a recording instrument of the type disclosed in the aforesaid Ross et al. patent.

Referring now to the drawings, and particularly to Fig. 1 thereof, the invention has been shown as embodied in a standardizing mechanism 10 applied to a recording instrument 11 of the type disclosed in the aforesaid Ross et al. patent. As explained in the Ross et al. patent, the recording mechanism is of the type employing a particular mechanical relay apparatus similar to that described and claimed in United States Letters Patent No. 1,935,732 issued November 21, 1933 to L. Y. Squibb. In brief, the mechanical relay apparatus comprises a pair of clamping members or bars 12 and 13 between which a pointer 14 of a sensitive device, such as a galvanometer G, is periodically free to deflect. One of the bars, for example the lower bar 13, is periodically moved toward engagement with the other and with the pointer 14 by means of linkage elements (not shown) and a cam 15 which is continuously rotated by a suitable motor-driven shaft 16. The mechanical relay apparatus also includes a pair of scissors-like pointer engaging arms or feelers 17 pivoted respectively intermediate their ends on the plate 18 and biased for movement toward each other by a spring 19.

Also pivoted at 20a on the plate 18 is a clutch arm 20, the outer ends of which are provided with clutch surfaces or shoes (not shown) arranged to cooperate with a clutch disk 21. The manner in which the sensitive mechanical relay operates to rotate the clutch disk 21 and its shaft 22 through an angle whose magnitude is dependent upon and constitutes a measure of the deflection of the pointer 14, is fully set forth in the above Squibb patent, and for the purposes of the present invention it is sufficient to point out that the galvanometer G is connected to be responsive to a condition under measurement, as will be more fully explained in connection with Fig. 7, the pointer 14 being periodically free to deflect in response to unbalance of a circuit caused by variations in magnitude of the condition to be measured or controlled. After a period of freedom, the clamping bars 12 and 13 engage and retain the pointer 14 in a fixed position. The feelers 17, being previously separated by the cam 15, are then freed and the opposite ends of the feelers 17 move toward each other. The pointer 14, acting as a stop for the upper end of one of the two arms, determines the amount of movement of the lower end of the other of the arms which engages a projection 20b on the clutch arm 20 to move it about its pivot 20a through an angle dependent upon the extent of deflection of the pointer from its central or neutral position. The pointer 14 is then released and the plate 18 is moved about its pivot 23 to bring the arm 20 into engagement with the clutch disk 21, whereupon one or the other of a pair of restoring cams 24 which are carried by the continuously rotating shaft 16 becomes effective to return the clutch arm 20 to its horizontal and neutral position so as to rotate the clutch disk 21 and the shaft 22 an amount which, in the manner described, depends upon the deflection of the pointer 14.

Also supported on and driven by the shaft 22 is a disk 25 which carries a suitable resistance or slide wire 26 which is included in the galvanometer or condition responsive network for the purpose of rebalancing the measuring network to return the galvanometer pointer 14 to its normal position. If the circuit is not fully rebalanced by a single adjustment, additional galvanometer deflections by the aforesaid cycle of operations will adjust the slide wire 26 until no deflection of the pointer 14 occurs, the network or circuit then being in balance. Also driven by the shaft 22 is a pulley 27 adapted to drive a suitable cord or endless belt 28 over suitable idler pulleys 29, the cord or belt being arranged to drive a suitable pen or marker-supporting carriage 30, the marking element of which is arranged to produce a curve or record 31 on a suitable record strip or chart 32.

Figures 2, 3, 4, 5:
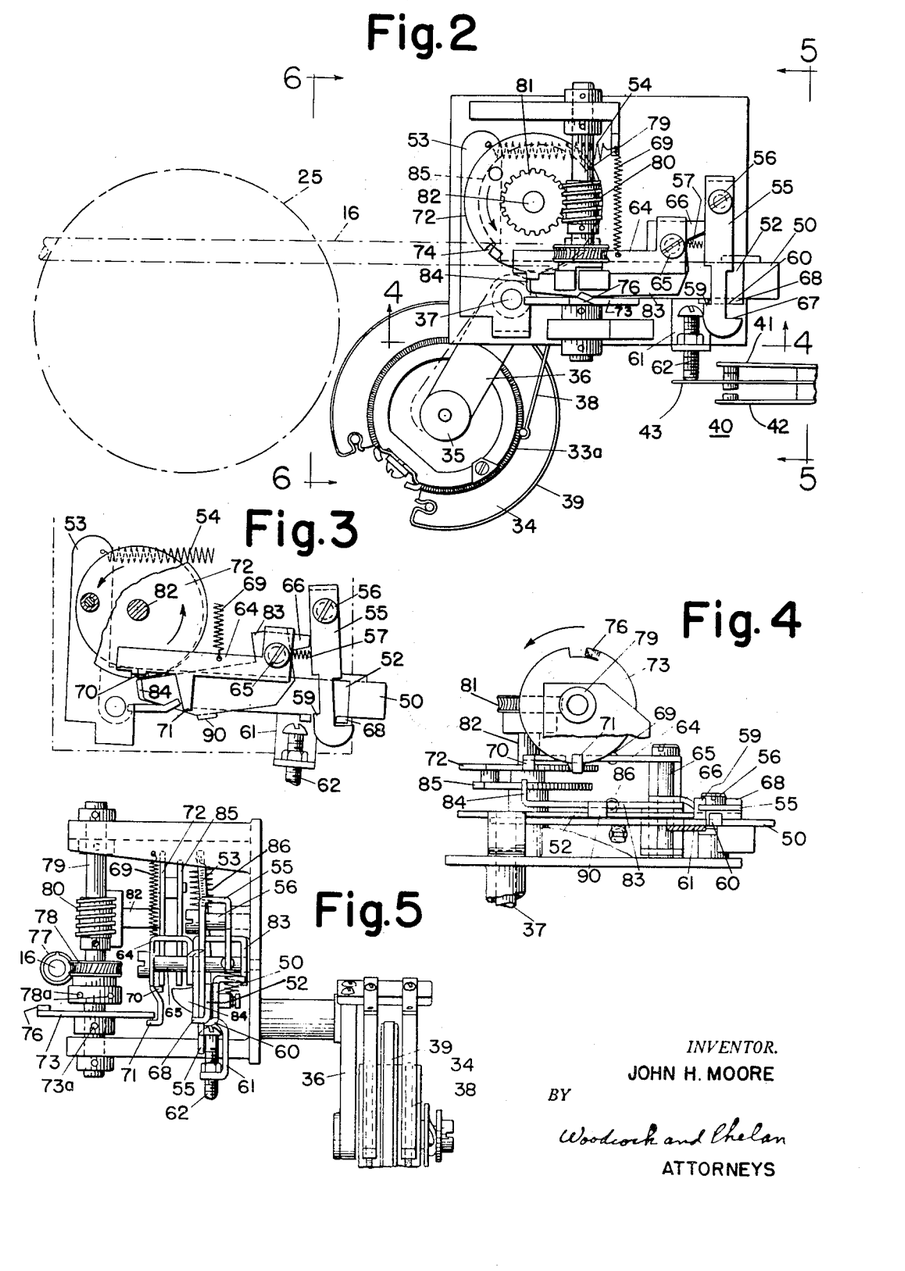
Fig. 2 is a front elevational view of the actuating mechanism shown in Fig. 1.
Fig. 3 is a fragmentary elevational view similar to Fig. 2 but showing the mechanism in another operating position.
Fig. 4 is a bottom plan view taken substantially along the line 4—4 of Fig. 2.
Fig. 5 is an end elevational view taken along the line 5—5 of Fig. 2.
Figure 6:
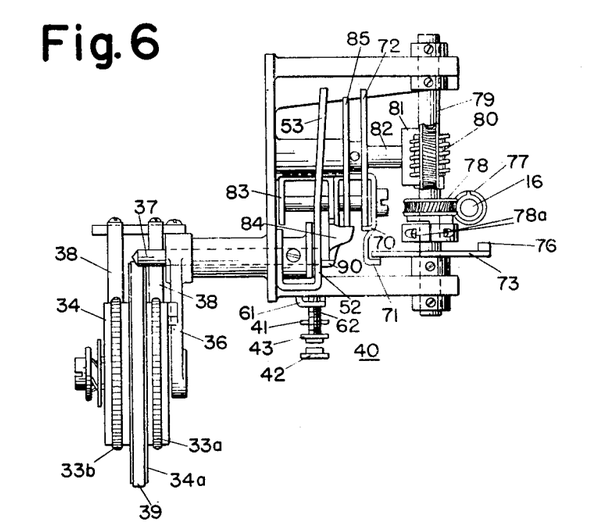
Fig. 6 is an end elevational view taken substantially along the line 6—6 of Fig. 2.

As shown in Fig. 1, the standardizing mechanism 10 includes a standardizing impedance which is in the form of a slide wire having one section 33a mounted on a disk 34 which is rotatable on a pin 35 carried by the lower end of an arm 36, the upper end of which is secured to a rotatable shaft 37. Although any suitable adjustable impedance or slide wire construction may be employed, the slide wire 33 of Fig. 7 has been shown (Figs. 1 and 6) as comprising a pair of similar resistance elements 33a and 33b mounted on opposite sides of an enlarged central portion 34a of the disk 34 and adapted to be engaged by a pair of similar contact members 38 suitably supported on an extension of the arm 36. The disk 34 is arranged to be moved into and out of peripheral driving engagement with the disk 25 on which the balancing slide wire 26 is carried and to this end the central portion 34a of the disk 34 is provided with a suitable friction member 39 (Figs. 2 and 6). As also shown in Fig. 1, the standardizing mechanism 10 likewise includes a double throw, single pole switch 40 comprising a pair of spaced stationary contacts 41 and 42 adapted to be selectively engaged by a movable contact 43 for purposes to be more fully described hereinafter.

Figure 7:
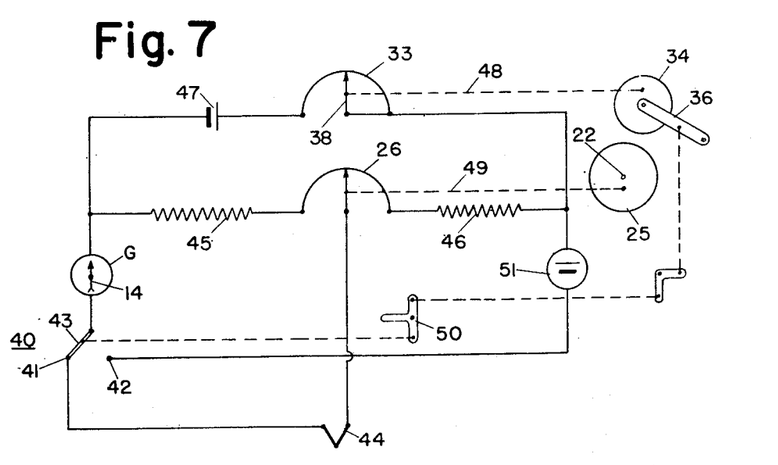
Fig. 7 is a circuit diagram of the recording instrument and standardizing mechanism shown in Fig. 1.

The operation of the above described measuring or recording instrument 11 and the relation thereto of the standardizing mechanism 10 will be understood more clearly by referring now to Fig. 7, in which is shown a schematic diagram including certain of the several elements thus far described for measuring the magnitude of a condition, for example the temperature, to which a thermocouple 44, for example, is subjected. As shown in Fig. 7, the measuring circuit includes a potentiometer comprising the slide wire 26 and a pair of end coils or resistors 45 and 46 energized from a source of current such as a battery 47 through the standardizing impedance 33. As indicated respectively by the broken lines 48 and 49, the slide wires 33 and 26 and their respective adjustable contacts are arranged for adjustment by rotation of the disks 34 and 25 on which they are respectively mounted. The galvanometer G, as shown in Fig. 1 is connected in circuit with the thermocouple 44 through the contacts 43 and 41 of the switch 40 with that portion of the potentiometer circuit which comprises the resistance 45 and the left hand portion of the slide wire 26. As heretofore indicated, if the temperature as measured by the thermocouple 44 is such as to produce a voltage different from that which exists across the portion of the potentiometer to which the galvanometer G and the thermocouple 44 are connected, the pointer 14 of the galvanometer G will be deflected and, through the mechanical relay, motion will be imparted to the shaft 22 on which the disk 25 is mounted so as to effect adjustment of the slide wire 26 in a direction tending to rebalance the measuring circuit.

In measuring systems of the null type, such for example as that shown in Fig. 7, in which the voltage of a battery is opposed to that of a device subject to a variable condition, i. e., the thermocouple 44, it is well understood by those skilled in the art that it is necessary to maintain constant the voltage applied by the battery to the potentiometer network, and it is further well understood that the voltage of batteries of the type used in such circuits, generally of the dry cell type, does not remain constant but tends to decrease with age and also varies with changes in the ambient temperature. Accordingly, it is desirable frequently to effect a standardizing operation wherein the effective voltage applied to the potentiometer circuit by the battery is varied at such intervals of time as may be necessary to minimize inaccuracy of measurement due to variations in the voltage applied to the potentiometer circuit.

As shown in Fig. 7, the movable contact 43 of the switch 40 and the arm 36 upon which the disk 34 is mounted are interconnected for simultaneous operation by a movable member 50. Operation of the movable member 50 in a counterclockwise direction from the position shown in Fig. 7, is thus effective to move the contact 43 of the switch 40 into engagement with the stationary contact 42 and at the same time to move the arm 36 in a counterclockwise direction so as to peripherally and drivingly engage the disk 34 with the disk 25. Operation of the switch 40 is effective to connect the galvanometer G directly across the potentiometer circuit in series with a suitable standard cell 51 which applies to the potentiometer circuit a constant or standard voltage which is opposed to the voltage supplied by the battery 47.

Under normal conditions the voltage of the standard cell 51 just balances the voltage across the potentiometer and consequently no deflection of the galvanometer G results. If, however, the voltage of the battery 47 has changed, the measuring circuit will no longer be balanced and consequently deflection of the pointer 14 of the galvanometer G will be effective through the heretofore described mechanical relay apparatus to adjust the balancing slide wire 26 in a direction to rebalance the standardizing circuit and the consequent rotation of the disk 25 will drive the disk 34 to adjust the standardizing impedance or slide wire 33 relative to its stationary contact 38 in a direction to bring to the desired value the effective voltage supplied by the battery 47 to the potentiometer circuit. While initiation and termination of the standardizing operation may be accomplished manually merely by operating the member 50 so as to effect so-called semi-automatic standardization, it is desirable, as pointed out in the aforesaid Ross et al. patent, to effect the restandardization of the measuring circuit automatically and periodically at intervals of, for example, one-half or three-quarters of an hour, and such automatic restandardization is effected in accordance with the present invention by the standardizing mechanism 10.

Referring now to Figs. 1 to 6, inclusive, the standardizing mechanism 10 is shown as comprising an operating member or lever 52 which is pivotally mounted for rotation on the shaft 37 and which is provided with an extended arm 53 to which is secured one end of an operating spring 54 which tends to move the operating lever 53 in a clockwise direction, as viewed in Fig. 1. Normally, however, the operating lever 52 is restrained against movement by the operating spring 54 by means of a pivoted latch member 55 mounted on a supporting pin 56 and biased by a suitable light spring 57 so as to cause a shoulder 59 on the latch 55 to engage a projection 58 extending from the operating lever 52.

Although operating lever 52 is free to move on the shaft 37, an operating connection between the lever 52 and the arm 36, which carries the standardizing impedance, is provided by means of the lever 50 which also serves to operate the movable contact 43 of the switch 40, through an abutment member 62. As shown in Figs. 2 and 5, lever 50, which is secured at one end to the shaft 37, is provided adjacent its other end with a projection 60 which underlies the lower edge of the operating lever 52 immediately adjacent the latching projection 58. Accordingly, downward movement of the operating lever 52, i. e., clockwise movement about the shaft 37 as viewed in Fig. 1, will effect a corresponding movement of the lever 50 so as to rotate the shaft 37 and move the arm 36 which carries the disk 34 on which the standardizing impedance is mounted. Likewise the arm 50 includes a downwardly extending finger 61 on which is threadedly and adjustably mounted an abutment member 62 arranged as shown in Fig. 1 to engage the movable contact 43 of the switch 40. In order to maintain the lug 60 on the member 50 in engagement with the operating member 52, a suitable spring 63 is provided which biases the member 50 and consequently the shaft 37 in a counterclockwise direction so as normally to maintain the disk 34 out of driving engagement with the disk 25. It will be apparent, however, that the manual or semi-automatic standardizing operation as heretofore described in connection with Fig. 7 may be accomplished merely by manually operating the member 50 in a clockwise direction against the force exerted by the spring 63 so as to move the disk 34 into driving engagement with the disk 25 and to operate the switch 40 even though the operating member 52 is retained in its normal latched position by the latch member 55.

In order to provide for release of the operating member 52 by the latch 55 in properly timed relation, a tripping member 64 is provided which is pivotally mounted on a suitably supported pivot pin 65. Extending from one end of the tripping lever 64 is a tripping arm 66 arranged abuttingly to engage one edge of the latch 55 so that upon clockwise movement of the tripping lever 64 about its pivot, the latch 55 will be moved in a counterclockwise direction to move the shoulder 59 out of engagement with the latching projection 58 and permit clockwise rotation of the operating member 52 under the force exerted by the operating spring 54. A second shoulder 67 on the latch lever 55 is arranged to cooperate with a second ear 68 projecting from the operating member 52 so as to limit the clockwise movement of the operating lever. Connected to the tripping lever 64 is a suitable spring 69 which tends to move the tripping lever 64 in a clockwise direction to effect release of the latch 55, but such movement of tripping lever 64 is normally restrained by a pair of cam follower fingers 70 and 71 which extend from the tripping lever 64 at the end thereof opposite from the finger 66 and which are respectively arranged to engage a pair of timing cams 72 and 73. The cam 72, as shown, is provided with a single cutout or recess 74 adapted to receive the arm 70 and the cam 73 is likewise provided with a single cutout 75 adapted to receive the arm 71, the cutout 75 being provided with a sloping wall 76, the purpose of which will be more fully described hereinafter.

It is desirable that the standardizing operation be initiated at times when the operation of the mechanical relay will be unaffected by the current in the coil of the galvanometer G, as when the pointer is clamped between the arms 12 and 13, or while the mechanical relay is adjusting shaft 22 in accordance with a preceding deflection of the galvanometer. In order to obtain the desired timing of the standardizing operation, the cam 73 is arranged to be driven from the shaft 16 of the recording instrument 11 through a worm 77 on the shaft 16 and a worm gear 78 carried by a shaft 79 on which the cam 73 is mounted. The shaft 79 likewise carries a worm 80 arranged to mesh with a second worm gear 81 mounted on a shaft 82 on which the cam 72 is mounted. It will thus be seen that both of the timing cams 72 and 73 are driven in positive timed relation to the rebalancing mechanism of the recorder 11. Furthermore, the worm 80 and the worm gear 81 provide a predetermined relatively high gear ratio between the shafts 79 and 82 so that the cam 73 will be driven through a large number of revolutions for each revolution of the cam 72. If, for example, a gear ratio of 40 to 1 is employed, the cam 73 will rotate forty times for each rotation of the cam 72, and it will be apparent that even though the cutout 75 in the cam 73 passes over the follower 71 on the tripping lever 64 once during each revolution, the tripping lever 64 will not operate until such time as the cutout 74 in the cam 72 and the cutout 75 in the cam 73 are simultaneously in alinement with the followers 70 and 71 respectively. Thus the cam 72 effectively determines the intervals at which the standardizing operation will be carried out while the high speed cam 73 accurately times the exact moment at which the tripping lever 64 will be operated to release the latch 55 and initiate the standardizing operation.

In order to effect termination of the standardizing operation and to restore the operating lever 52 to its normal latched position so as to accumulate energy in the operating spring 54 for initiating a succeeding standardizing operation, the standardizing mechanism 10 is provided, in accordance with the present invention, with a master lever 83 which is pivoted adjacent one end on the pivot pin 65 and which is provided adjacent its other end with a projecting follower portion 84 arranged to engage the periphery of a master cam 85 which is mounted on the shaft 82 and consequently rotatable with the timing cam 72. The cam follower 84 is maintained in engagement with the periphery of the master cam 85 by a master spring 86, the master cam having a single abrupt fall 87 in the periphery thereof, the inner and outer edges of which are connected by a peripheral contour 88 of gradually increasing radius. It will be observed that as the master cam 85 rotates so as to cause the periphery thereof to traverse the follower 84, the master lever 83 will gradually be moved in a counterclockwise direction about its pivot 65 to stress the master spring 86 and gradually accumulate energy therein until such time as the follower 84 passes beyond the outer edge of the fall 87, whereupon the master spring 86 will be released to effect clockwise operation of the master lever 83.

In accordance with the present invention, the peripheral contour 88 of the master cam 85 is parabolic in form, that is, the radius gradually increases as a function of the square root of the angular displacement from the inner edge of the fall 87. Thus, the torque exerted on the shaft 82 and consequently on the recorder shaft 16 due to stressing of the master spring 86 is constant and the torque load on the driving motor for the shaft 16 is likewise constant. As shown best in Fig. 4, the master lever 83, in addition to the cam follower 84, is provided with a laterally extending lug or finger 90 which underlies the operating lever 52 so that clockwise movement of the master lever 83 about its pivot 65 is effective to cause counterclockwise movement of the operating lever 52 about its pivot 37, whereby the operating lever 52 may be returned to its latched position against the force exerted by the operating spring 54.

It is now thought that a complete understanding of the invention may be had from a description of the operation of the mechanism through a complete standardizing cycle, particular reference being had to Figs. 8 to 11, inclusive, wherein corresponding heretofore described parts are similarly identified even though certain of the parts are somewhat distorted in order to illustrate more clearly the operation.

Figure 8:
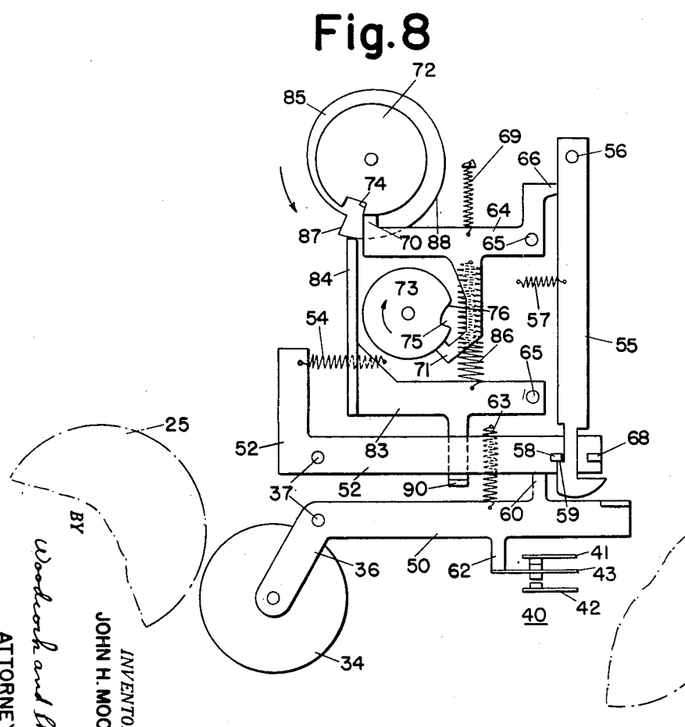
Figs. 8 to 11, inclusive, are schematic diagrams of the standardizing mechanism with certain of the parts relatively displaced and distorted for arrangement in a single plane and showing the operating mechanism in its various positions during a typical standardizing operation.

In Fig. 8 the mechanism is shown in the position which the various parts will occupy just prior to the initiation of a standardizing operation. It will be seen that the operating member 52 is held by the latch 55 against movement by the operating spring 54, and that the tripping lever 64 is held against operation by the tripping spring 69 by engagement of the cam followers 70 and 71 on the tripping lever with the timing cams 72 and 73 respectively. It will likewise be observed that the follower 84 on the master lever 83 is approaching the maximum radius point on the peripheral contour 88 of the master cam 85, and that consequently the master lever occupies a position in which approximately maximum energy has been accumulated in the master spring 86 and in which the finger 90 is in spaced relation to the operating lever 52.

Figure 9:
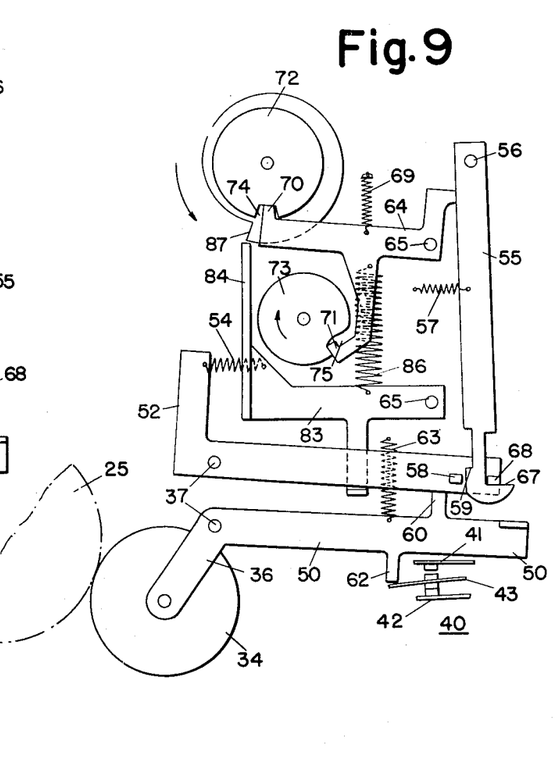

In Fig. 9 the respective positions of the parts are shown to correspond to the initiation of the standardizing operation. It will be seen that the cam followers 70 and 71 are respectively in register with the recesses 74 and 75 in the timing cams 72 and 73, and that consequently the tripping lever 64 has been operated by the tripping spring 69 to move the latch lever 55 in a counterclockwise direction about its pivot 56 against the force of the latch spring 57. Movement of the latch member 55 in this direction has effected release of the operating lever 52 which has consequently been moved by the operating spring 54 in a clockwise direction from the position of Fig. 8, the operating lever, through the projection 60, effecting a corresponding movement of the manually operable lever 50 to disengage the movable contact 43 of the switch 40 from the upper stationary contact 41 and to engage the movable contact with the lower stationary contact 42, thus completing the standardizing circuit as heretofore explained in connection with Fig. 7. At the same time movement of the lever 50 has caused the shaft 37 to rotate so as to move the arm 36 in a clockwise direction and bring the disk 34 into peripheral driving engagement with the disk 25. Accordingly, the standardizing operation will be automatically carried out as heretofore described.

Figures 10, 11:
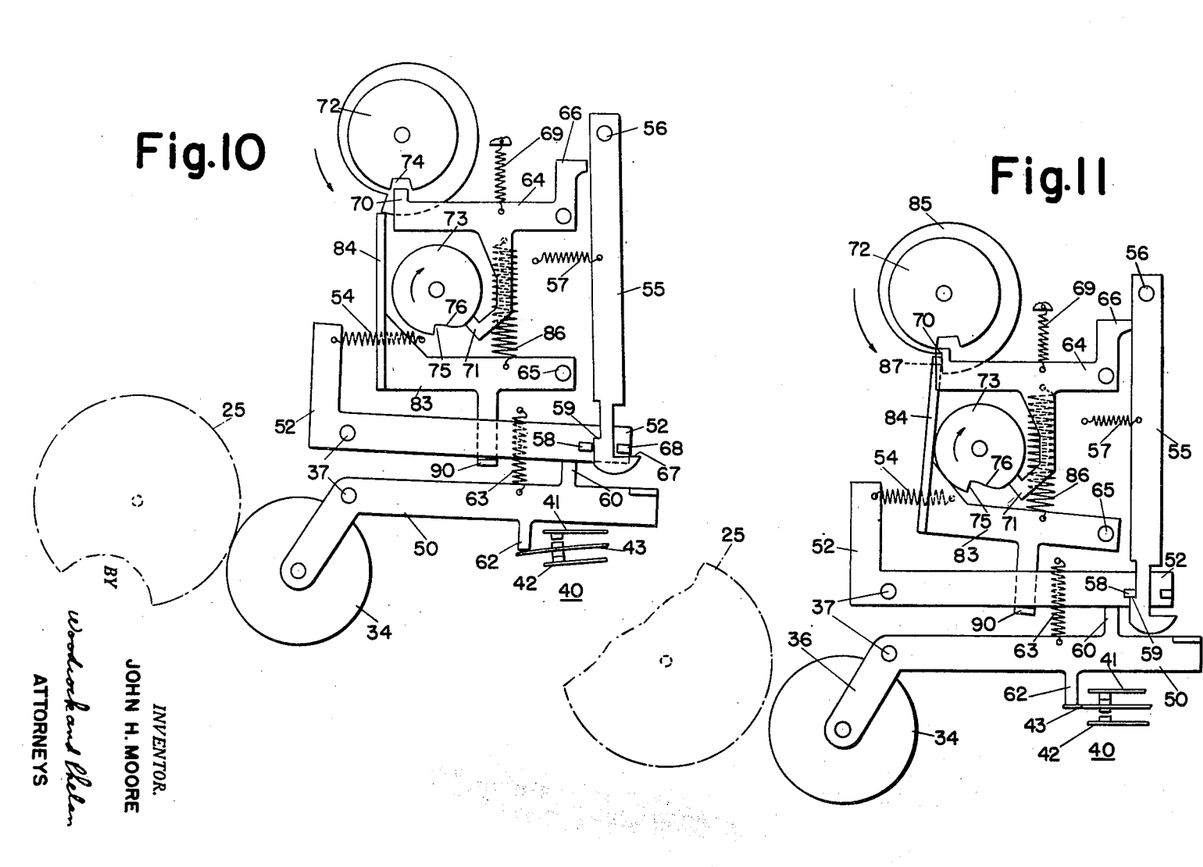

In Fig. 10, the parts have been shown in the position occupied a short instant after initiation of the standardizing operation, and it will be observed that while the recess 74 in the slowly driven timing cam 72 is still in register with the follower 70 on the tripping lever 64, the high speed timing cam 73 has moved sufficiently to cause the sloping edge 76 thereof to move the follower 71 outwardly, thus returning the tripping lever 64 to its normal position out of engagement with the latch lever 55.

In the schematic representation of the standardizing apparatus, Figs. 8–11, the sloping surface 76 has been illustrated as a radially disposed surface, whereas in the embodiment of the invention illustrated in Figs. 1–5 the surface 76 is an axially disposed one. Its function is the same in the diagrammatic illustration as in the embodiment of the invention of Figs. 8–11. The advantage of the axially-disposed surface is that it simplifies the shape of the tripping lever 64 which is provided with the projection or cam follower 70 cooperating with the cam 72 on shaft 82 and also with a projection or cam follower 71 which cooperates with the inclined surface 76 of cam 73 carried by the shaft 79 disposed at right angles to the shaft 82. Thus, while the lever 64 moves in a plane parallel with that in which the cam 72 is disposed, the cam 73 rotating in a plane at right angles to the plane of movement of the lever 64 is effective to restore the lever 64 to its original position after movement of the cam follower 70 into the recess 74.

Inasmuch as the tripping spring 69 is a very light spring, only a very slight torque load is imposed on the driving motor during this resetting of the tripping lever. In the position of Fig. 10, the latch member 55 is prevented from returning to its latching position by engagement of the lug 58 on the lever 52 with one edge of the latch 55, the lever 52 being held in its operated position by the operating spring 54, and the switch 40 as well as the standardizing impedance are likewise held in the operated position of Fig. 9.

In Fig. 11, the parts are shown in the position occupied at the termination of the standardizing operation. It will be observed that in Fig. 11 the follower 84 on the master lever 83 has now moved over the fall 87 of the master cam, thereby releasing the master spring 86 for movement of the master lever 83 about its pivot 65 in a clockwise direction. During this clockwise movement of the master lever 83, the projection 90 thereon engages the operating lever 52 so as to rotate the operating lever in a counterclockwise direction about its pivot 37, thereby permitting the latch lever 55 to return to its normal latching position under the force exerted by the spring 57, and to permit the lever 50 to return the switch 40 and the disk 34 to their respective normal positions, return of the lever 50 being effected by its biasing spring 63. In returning the operating lever 52 to its normal latched position, a portion of the energy previously stored in the master spring 86 is transferred to the operating spring 54 of the operating lever 52 for use in a succeeding standardizing operation. It will be observed that the follower 84 on the master lever 83 engages the peripheral contour 88 of the master cam 85 (Fig. 11) at the inner edge of the fall 87, i. e., at its point of minimum radius, and during the interval which occurs between standardizing operations, the master cam 85 will move from the position shown in Fig. 11 to the position shown in Fig. 8, so as gradually to store energy in the master spring 86 while exerting only a constant minimum torque on the shaft 16 and the driving motor of the recorder or measuring instrument.

It will thus be observed that, in accordance with the present invention, both the initiation and the termination of the standardizing operation are accomplished without imposing any sudden or heavy torque on the driving motor, and in addition an abrupt snap action is obtained at both the beginning and the end of the standardizing period.

In order to synchronize the standardizing mechanism with the recorder mechanism to insure proper timing of the standardizing operation, it is necessary only to loosen the locking screws 78a (Fig. 5) on the main driving worm gear 78, whereupon the standardizing mechanism may be rotated, for example, by means of the timing cam 73, until the low speed timing 72 is brought into operating position with the recess 74 in alinement with the follower 70. The shaft 16 of the recorder may then be rotated until the restoring cams 24 of the mechanical relay are in their neutral positions, shown in Fig. 1, whereupon the locking screws 78a may be tightened. Next, the locking screws 73a in the high-speed timing cam are loosened and this cam is rotated so as to bring the recess 75 therein in registry with the follower 71, whereupon the locking screws 73a may be tightened. The length of time allowed for carrying out the standardizing operation is determined by the relative position of the master cam 85 with respect to the low speed timing cam 72, and suitable adjusting screws (not shown) may be provided for the master cam in order to permit adjustment of the relative position thereof.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed is:

1. An actuating mechanism comprising an operating member mounted for movement between a latched position and a released position, first resilient means biasing said member toward said released position, second resilient means, means including a rotatably driven cam for gradually accumulating energy in said second resilient means, means operable in timed relation to said cam for releasing said member for movement by said first biasing means, said cam being effective to release said second resilient means a predetermined time after said release of said operating member, and means operable by said second resilient means for returning said member to said latched position thereby to transfer to said first resilient means a portion of the energy accumulated in second resilient means.

2. An actuating mechanism comprising an operating member mounted for movement between a latched position and a released position, an operating spring for moving said member toward said released position, a master spring, means including a rotatably driven cam for stressing said master spring, means operable in timed relation to said cam for releasing said member for movement by said operating spring, said cam being effective to release said master spring a predetermined time after said release of said operating member, and means operable by said master spring for returning said member to said latched position thereby to stress said operating spring.

3. An actuating mechanism comprising an operating member mounted for movement between a latched position and a released position, an operating spring for moving said member toward said released position, a master spring, means including a rotatably driven cam for stressing said master spring, said cam having a parabolic contour and an abrupt fall, means operable in timed relation to said cam for releasing said member for movement by said operating spring, said fall of said cam being effective to release said master spring a predetermined time after said release of said operating member, and means operable by said released master spring for returning said member to said latched position thereby to stress said operating spring.

4. An actuating mechanism comprising an operating member mounted for movement between a latched position and a released position, an operating spring for moving said member toward said released position, a master spring, means including a rotatably driven cam for stressing said master spring, said cam having an abrupt fall, the inner and outer edges of which are connected by a contour of the radius of which increases as a function of the square root of the angular displacement from said inner edge, means operable in timed relation to said cam for releasing said member for movement by said operating spring, said fall of said cam being effective to release said master spring a predetermined time after said release of said operating member, and means operable by said released master spring for returning said member to said latched position thereby to stress said operating member.

5. An actuating mechanism comprising a pivoted operating lever, an operating spring for said lever, releasable means for latching said operating lever against movement by said spring, a master spring, means including a rotatably driven cam for storing energy in said master spring, means operable in timed relation to said cam for releasing said latching means to permit movement of said operating lever by said operating spring, said cam means being effective to release said master spring a predetermined time after said release of said latching means, and means operable by said released master spring for returning said operating member to its latched position thereby to transfer to said operating spring a portion of the energy stored in said master spring by said cam.

6. An actuating mechanism comprising a pivoted operating lever, an operating spring for said lever, releasable means for latching said operating lever against movement by said spring, a master spring, a rotatably driven cam having a parabolic contour and an abrupt fall, means including a cam follower engaging said contour for gradually storing energy in said master spring during rotation of said cam, means operable in timed relation to said cam for releasing said latching means to permit movement of said operating lever by said operating spring, said fall of said cam being effective to permit abrupt movement of said cam follower by said master spring a predetermined time after said release of said latching means, and means operable by said cam follower for returning said operating lever to its latched position thereby to transfer to said operating spring a portion of the energy stored in said master spring by said cam and follower.

7. An actuating mechanism comprising a pivoted operating lever, an operating spring for said lever, releasable means for latching said operating lever against movement by said spring, a master spring, a substantially constant speed rotary cam having an abrupt fall the inner and outer edges of which are connected by a peripheral contour the radius of which increases as a function of the square root of the angular displacement from said inner edge, means including a cam follower engaging said contour for gradually storing energy in said master spring during rotation of said cam, means operable in timed relation to said cam for releasing said latching means to permit movement of said operating lever by said operating spring, said fall of said cam being effective to permit abrupt movement of said cam follower by said master spring a predetermined time after said release of said latching means, and means operable by said cam follower for returning said operating lever to its latched position thereby to transfer to said operating spring a portion of the energy stored in said master spring by said cam and follower.

8. An actuating mechanism comprising an operating member mounted for movement between a latched position and a released position, first biasing means biasing said member toward said released position, a rotatably driven cam having a peripheral contour of gradually increasing radius extending between the inner and outer edges of an abrupt fall, a master lever having a follower portion and a resetting portion, second biasing means biasing said master lever in a direction to engage said follower portion with said cam and to engage said resetting portion with said operating member, said increasing radius of said cam effecting movement of said master lever to accumulate energy in said second biasing means and to disengage said resetting portion from said member, means operable in timed relation to said cam for releasing said member for movement by said first biasing means, said fall of said cam being effective to permit abrupt movement of said master lever by said second biasing means a predetermined time after said release of said operating member whereby said resetting portion is effective to return said operating member to said latched position thereby to transfer to said first biasing means a portion of the energy accumulated in said second biasing means.

9. An actuating mechanism comprising an operating member mounted for movement between a latched position and a released position, an operating spring for moving said member toward said released position, a rotatably driven cam having a peripheral contour of gradually increasing radius extending between the inner and outer edges of an abrupt fall, a master lever having a follower portion and a resetting portion, a master spring biasing said master lever in a direction to engage said follower portion with said cam and said resetting portion with said operating member, said increasing radius of said cam effecting movement of said master lever to stress said master spring and disengage said resetting portion from said member, means operable in timed relation to said cam for releasing said member for movement by said operating spring, said fall of said cam being effective to permit abrupt movement of said master lever by said master spring a predetermined time after said release of said operating member whereby said resetting portion is effective to return said operating member to said latched position thereby to stress said operating spring.

10. An actuating mechanism comprising an operating member mounted for movement between a latched position and a released position, an operating spring for moving said member toward said released position, a rotatably driven cam having a peripheral contour of gradually increasing radius extending between the inner and outer edges of an abrupt fall, said radius increasing as a function of the square root of the angular displacement from said inner edge, a master lever having a follower portion and a resetting portion, a master spring biasing said master lever in a direction to engage said follower portion with said cam and said resetting portion with said operating member, said increasing radius of said cam effecting movement of said master lever to stress said master spring at a uniform rate and disengage said resetting portion from said member, means operable in timed relation to said cam for releasing said member for movement by said operating spring, said fall of said cam being effective to permit abrupt movement of said master lever by said master spring a predetermined time after said release of said operating member whereby said resetting portion is effective to return said operating member to said latched position thereby to stress said operating spring.

11. An actuating mechanism comprising a pivoted operating lever, an operating spring for said lever, releasable means for latching said operating lever against movement by said spring, a rotatably driven cam having a peripheral contour of gradually increasing radius extending between the inner and outer edges of an abrupt fall, a master lever having a follower portion and a resetting portion, a master spring biasing said master lever in a direction to engage said follower portion with said cam and said resetting portion with said operating lever, said increasing radius of said cam effecting movement of said master lever to store energy in said master spring and to disengage said resetting portion from said operating lever, means operable in timed relation to said cam for releasing said latching means to permit movement of said operating lever by said operating spring, said fall of said cam being effective to permit abrupt movement of said master lever by said master spring a predetermined time after said release of said latching means whereby said resetting portion operates to return said operating lever to its latched position thereby to transfer to said operating spring a portion of said energy stored in said master spring.

12. A low torque actuating mechanism for initiating and terminating a standardizing operation comprising a rotating cam structure, a standardizing impedance, driving means normally out of engagement with said impedance, an operating lever movable between a latched and a released position for moving said impedance into and out of engagement with said driving means, means biasing said lever for movement from said latched position, a second biasing means, means including said rotating cam structure for gradually accumulating energy in said second biasing means, means operable in timed relation to said cam structure for releasing said operating lever for movement by said first mentioned biasing means to drivingly engage said impedance with said driving means, said cam structure being effective to release said second biasing means a predetermined time after said release of said operating lever, and means operable by said released second biasing means for returning said operating lever to said latched position thereby to disengage said impedance from said driving means and to transfer to said first mentioned biasing means a portion of the energy accumulated in said second biasing means.

13. A low torque actuating mechanism for initiating and terminating a standardizing operation comprising a rotating cam structure including a cam having a parabolic contour and an abrupt fall, a standardizing impedance, driving means normally out of engagement with said impedance, an operating lever movable between a latched and a released position for moving said impedance into and out of engagement with said driving means, means biasing said lever for movement from said latched position, a second biasing means, means including said rotating cam for gradually accumulating energy in said second biasing means, means operable in timed relation to said cam structure for releasing said operating lever for movement by said first mentioned biasing means to drivingly engage said impedance with said driving means, said fall of said cam being effective to release said second biasing means a predetermined time after said release of said operating lever, and means operable by said released second biasing means for returning said operating lever to said latched position thereby to disengage said impedance from said driving means and to transfer to said first mentioned biasing means a portion of the energy accumulated in said second biasing means.

14. A low torque actuating mechanism for initiating and terminating a standardizing operation comprising a rotating cam structure including a cam having an abrupt fall the inner and outer edges of which are connected by a peripheral contour the radius of which increases as a function of the square root of the angular displacement from said inner edge, a standardizing impedance, driving means normally out of engagement with said impedance, an operating lever movable between a latched and a released position for moving said impedance into and out of engagement with said driving means, means biasing said lever for movement from said latched postition, a second biasing means, means including said rotating cam for gradually accumulating energy in said second biasing means, means operable in timed relation to said cam structure for releasing said operating lever for movement by said first mentioned biasing means to drivingly engage said impedance with said driving means, said fall of said cam being effective to release said second biasing means a predetermined time after said release of said operating lever, and means operable by said released second biasing means for returning said operating lever to said latched position thereby to disengage said impedance from said driving means and to transfer to said first mentioned biasing means a portion of the energy accumulated in said second biasing means.

15. A low torque actuating mechanism for initiating and terminating a standardizing operation comprising a rotating cam structure, a standardizing impedance, driving means normally out of driving engagement with said impedance, a pivoted operating lever, means interconnecting said lever and said impedance for movement of said impedance by said lever, first biasing means biasing said lever for movement to engage said impedance with said driving means, releasable means for latching said operating lever against movement by said biasing means, said cam structure including a cam having a peripheral contour of gradually increasing radius extending between the inner and outer edges of an abrupt fall, a master lever having a follower portion and a resetting portion, second biasing means biasing said master lever in a direction to engage said follower portion with said cam and to engage said resetting portion with said operating lever, said increasing radius of said cam effecting gradual movement of said master lever to accumulate energy in said second biasing means and to disengage said resetting portion from said operating lever, means operable in timed relation to said cam structure for releasing said latching means to permit movement of said operating lever by said first biasing means to drivingly engage said impedance with said driving means, said fall of said cam being effective to permit abrupt movement of said master lever a predetermined time after said release of said latching means whereby said resetting portion returns said operating lever to its latched position thereby to disengage said impedance from said driving means and to transfer to said first biasing means a portion of said energy stored in said second biasing means.

16. For use with a measuring system having a balancing mechanism, an automatic standardizing mechanism comprising an adjustable standardizing impedance having a movable support, first spring means for moving said support to effect coupling engagement between said impedance and said balancing mechanism, releasable means for preventing movement of said support by said spring means, rotating cam structure, second spring means, means including said cam structure for slowly accumulating energy in said second spring means, means operable in timed relation to said cam structure for releasing said latching means to permit coupling movement of said support by said first spring means, said cam structure being effective to release said second spring means a predetermined time after said coupling movement, and means operated by said second spring means for returning said support to its latched position to decouple said impedance and said balancing mechanism and to transfer to said first spring means a portion of the energy accumulated in said second spring means.

17. For use with a measuring system having a balancing mechanism, an automatic standardizing mechanism comprising an adjustable standardizing impedance having a movable support, first spring means for moving said support to effect coupling engagement between said impedance and said balancing mechanism, releasable means for preventing movement of said support by said spring means, rotating cam structure including a cam having a peripheral contour the radius of which increases as a parabolic function from the inner to the outer edge of an abrupt fall, second spring means, means including said cam structure for slowly accumulating energy in said second spring means, means operable in timed relation to said cam structure for releasing said latching means to permit coupling movement of said support by said first spring means, said fall of said cam being effective to release said second spring means a predetermined time after said coupling movement, and means operated by said second spring means for returning said support to its latched position to decouple said impedance and said balancing mechanism and to transfer to said first spring means a portion of the energy accumulated in said second spring means.

JOHN H. MOORE.

No references cited.